(12) United States Patent
Ljung et al.

(10) Patent No.: US 10,225,753 B2
(45) Date of Patent: Mar. 5, 2019

(54) RADIO TERMINAL MEASUREMENTS IN EXTENDED DRX

(71) Applicant: Sony Corporation, Tokyo (JP)

(72) Inventors: Rickard Ljung, Helsingborg (SE); Basuki Priyanto, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 120 days.

(21) Appl. No.: 14/697,069

(22) Filed: Apr. 27, 2015

(65) Prior Publication Data

US 2016/0212642 A1    Jul. 21, 2016

Related U.S. Application Data

(63) Continuation-in-part of application No. PCT/EP2015/050709, filed on Jan. 15, 2015.

(51) Int. Cl.
*H04W 24/08* (2009.01)
*H04W 52/02* (2009.01)
*H04W 76/28* (2018.01)
*H04W 68/00* (2009.01)

(52) U.S. Cl.
CPC ........... *H04W 24/08* (2013.01); *H04W 76/28* (2018.02); *H04W 52/0209* (2013.01); *H04W 68/00* (2013.01); *Y02D 70/00* (2018.01); *Y02D 70/1242* (2018.01); *Y02D 70/1262* (2018.01); *Y02D 70/164* (2018.01); *Y02D 70/21* (2018.01); *Y02D 70/24* (2018.01)

(58) Field of Classification Search
CPC ............... H04W 24/08; H04W 76/048; H04W 52/0209; H04W 68/00; H04W 24/10; H04W 36/30; H04W 36/32; H04W 52/28–52/285; H04W 4/005; H04W 28/0215; H04W 76/28; Y02D 70/1262; Y02D 70/21; Y02D 70/1242; Y02D 70/24; Y02D 70/164; Y02D 70/00
See application file for complete search history.

(56) References Cited

U.S. PATENT DOCUMENTS

| | | | | |
|---|---|---|---|---|
| 2008/0167089 A1* | 7/2008 | Suzuki | ............ | H04L 1/1829 455/574 |
| 2009/0238098 A1* | 9/2009 | Cai | ............ | H04W 76/28 370/254 |
| 2010/0323683 A1* | 12/2010 | Kazmi | ............ | H04W 64/00 455/422.1 |
| 2011/0269462 A1* | 11/2011 | Sagfors | ............ | H04W 36/36 455/436 |
| 2012/0033595 A1* | 2/2012 | Aoyama | ............ | H04W 76/048 370/311 |

(Continued)

*Primary Examiner* — Ivan O Latorre
(74) *Attorney, Agent, or Firm* — Tucker Ellis LLP (57) ABSTRACT

A terminal, and a control method for a terminal in a wireless communication system including a network of base stations, operating under extended discontinuous reception. The method comprises the steps of performing discontinuous reception of signals from a serving base station so as to listen for a paging message, with a reception periodicity having a first interval; performing radio link measurements so as to determine the need for cell selection, with a measurement periodicity having a second interval; wherein the second interval is shorter than the first interval.

18 Claims, 3 Drawing Sheets

(56) References Cited

U.S. PATENT DOCUMENTS

| | | | |
|---|---|---|---|
| 2012/0115552 A1* | 5/2012 | Bhattacharya | H04W 52/0261 455/574 |
| 2013/0028184 A1* | 1/2013 | Lee | H04W 8/22 370/328 |
| 2013/0188503 A1* | 7/2013 | Anepu | H04W 24/10 370/252 |
| 2013/0194954 A1* | 8/2013 | Dalsgaard | H04W 24/10 370/252 |
| 2013/0242774 A1* | 9/2013 | Wang | H04W 36/30 370/252 |
| 2013/0244657 A1* | 9/2013 | Wang | H04W 36/24 455/436 |
| 2013/0258883 A1* | 10/2013 | Vargas Bautista | H04W 36/0094 370/252 |
| 2013/0315122 A1* | 11/2013 | Sirotkin | H04W 52/0225 370/311 |
| 2014/0016492 A1* | 1/2014 | Jung | H04W 24/10 370/252 |
| 2014/0295820 A1 | 10/2014 | Kim et al. | |
| 2014/0321343 A1* | 10/2014 | Gupta | H04W 36/0066 370/311 |
| 2015/0215830 A1* | 7/2015 | Dalsgaard | H04W 36/0094 455/444 |
| 2015/0282076 A1* | 10/2015 | Larmo | H04W 52/0209 370/311 |
| 2015/0350976 A1* | 12/2015 | Kodali | H04W 76/28 455/440 |
| 2016/0007252 A1* | 1/2016 | Larmo | H04W 36/0088 370/332 |
| 2016/0029433 A1* | 1/2016 | Jeong | H04W 52/0216 370/311 |

\* cited by examiner

RADIO TERMINAL MEASUREMENTS IN EXTENDED DRX

CROSS-REFERENCE TO RELATED APPLICATION

This application is a continuation-in-part of International Application No. PCT/EP2015/050709, filed Jan. 15, 2015, the disclosure of which is hereby incorporated herein by reference.

FIELD OF THE INVENTION

The present invention relates to operation of a terminal in a radio communications system, and particularly to measurements made in idle mode in a system employing long paging cycles.

BACKGROUND

In a cellular radio communications system, mobile terminals operate by radio communication with base stations of a mobile network. The terminal is typically camped to one base station, herein referred to as a serving base station. When the terminal moves within the coverage area of the network, or if the radio characteristics of the connection deteriorate, handover to another base station will sometimes be required. The principle idle mode cell selection in many cellular standards, e.g. the 3GPP standards for WCDMA and LTE, are based on mobile device detection of base station signals. Each device will experience the received signals differently, e.g. due different positions in a cell, and based on the experienced signal quality it may select a suitable cell for camping. The serving base station may store, or otherwise have access to, a neighbour cell list. This represents a list of at least the most nearby cell base stations, and may be transmitted from the serving base station to the mobile device. In order to prepare for handover, terminals are normally configured to perform measurements on at least neighbouring base stations, so as to determine its quality as a candidate cell for handover.

When a mobile terminal, also commonly referred to as user equipment UE, is in so-called idle mode, it is registered to a certain mobile network and camped to a base station. However, it is not active in any voice or data transmissions. In this mode, the terminal is typically configured to periodically listen to regularly broadcast information from the base station, in order to receive indication whether e.g. the terminal is being paged, e.g. due to an incoming phone call. The periodicity of this broadcast information determined by the network, and denoted idle mode Discontinuous reception (DRX) cycle. During these paging occasions the terminal will also utilize a received pilot signal from at least the serving base station, to determine the current radio conditions, such as signal strength and quality. As of today in 3GPP LTE standard, the DRX cycle can be between 0.32 s to 2.56 s.

In case the signal strength/quality is below a threshold when the terminal is in idle mode, the terminal may initiate additional measurements to find other potential base stations within proximity. Normally, measurements are made on pilot signals of neighbour cells, as given by the serving base station. If one or more such other base station pilot signals are received, the measured signal strength and quality from these base stations are compared to each other to determine if the terminal should make a cell reselection and thereby switch to continue being registered to a mobile network but being camped to another base station. The need for such cell reselection is typically occasioned by terminal mobility, when the terminal moves between the coverage areas of different base stations; i.e. between cells.

For the specific example of 3GPP, the frequency of such signal strength measurements of the serving cell is defined in TS 36.133, section 4.2.2.1. It is stated that "The UE shall measure the RSRP [Reference Signal Received Power] and RSRQ [Reference Signal Received Quality] level of the serving cell and evaluate the cell selection criterion S defined in [TS 36.304] for the serving cell at least every DRX cycle". Within 3GPP there is work ongoing to define solutions for M2M type terminals, where one focus area is to reach very long battery lifetime. One proposed area to consider for standardization within 3GPP Release 13 timeframe is extended DRX cycles way beyond existing range, e.g. at least in the order of 10-60 seconds.

Extended DRX cycle will have implications on the base station control over measurement intervals, since measurements every DRX cycle will be relatively infrequent.

US2014295820 is related to this context, and discloses a method of controlling DRX operation of a signal for a terminal in a wireless communication system, which includes the steps of: measuring velocity-related information of the terminal; transmitting the measured velocity-related information to a base station; receiving from the base station, in response to the transmission of the velocity-related information, discontinuous reception operation set information for a variable discontinuous reception operation; and performing the discontinuous reception operation according to the received discontinuous reception operation set information.

SUMMARY OF THE INVENTION

It has been realised by the inventors that while a scheme of extended DRX will be targeted to minimise power consumption, there is also a risk that a terminal may lose its network connection in between DRX cycles.

According to a first aspect, this problem is targeted by means of a control method for a terminal in a wireless communication system including a network of base stations, the method comprising:

performing discontinuous reception of signals from a serving base station so as to listen for a paging message, with a reception periodicity having a first interval;

performing radio link measurements so as to determine the need for cell selection, with a measurement periodicity having a second interval;

wherein the second interval is shorter than the first interval.

In one embodiment, the method comprises:
applying the second interval to the measurement periodicity responsive to detection of occurrence of an interval decrease triggering event.

In one embodiment, said interval decrease triggering event is a cell reselection made by the terminal.

In one embodiment, said interval decrease triggering event is the occurrence of a predetermined number of cell reselections made by the terminal within a decisive period of time.

In one embodiment, the method comprises:
receiving positioning signals;
establishing a measurement of movement based on the positioning signals;
wherein said interval decrease triggering event is a determining that the terminal is moving.

In one embodiment, the method comprises:

applying a third interval for the measurement periodicity after the step of applying the second interval, wherein the third interval is longer than the second interval, responsive to detection of occurrence of an interval increase trigger.

In one embodiment, said interval increase trigger is absence of any cell selection or the absence of any cell reselection within a predetermined period of time.

In one embodiment, said interval increase trigger is a determination that the terminal is no longer moving.

In one embodiment, the third interval is equal to the first interval of the reception periodicity.

In one embodiment, the first interval is n times the second interval, where n is an integer >1.

In one embodiment, the method comprises:

receiving a signal from the network, comprising data determining the reception periodicity, and receiving a signal from the network, comprising data determining the measurement periodicity.

In one embodiment, the method comprises:

establishing, from said data, a given reception periodicity for a given type of terminal, and applying said given reception periodicity if the terminal is of said given type of terminal.

In one embodiment, the method comprises:

establishing, from said data, a given measurement periodicity for a given type of terminal, and applying said given measurement periodicity if the terminal is of said given type of terminal.

According to a first aspect, this problem is targeted by means of a terminal for operating with discontinuous reception in a wireless communication system, the terminal comprising:

a transceiver configured to transmit and receive signals to and from a base station; and a controller connected to the transceiver, configured to control the transceiver to perform discontinuous reception of signals from a serving base station so as to listen for a paging message, with a reception periodicity having a first interval; and control the transceiver to perform radio link measurements so as to determine the need for cell selection, with a measurement periodicity having a second interval, characterised in that the controller is configured to set a shorter second interval for the measurement periodicity than the first interval of the reception periodicity, for at least periods of time.

In various embodiments, the controller is configured to control the terminal to operate according to any one of the preceding method steps.

BRIEF DESCRIPTION OF THE DRAWINGS

Various embodiments of the invention will be described below with reference to the accompanying drawings, in which.

DETAILED DESCRIPTION OF EMBODIMENTS

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail.

The functions of the various elements including functional blocks, including but not limited to those labelled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 1:
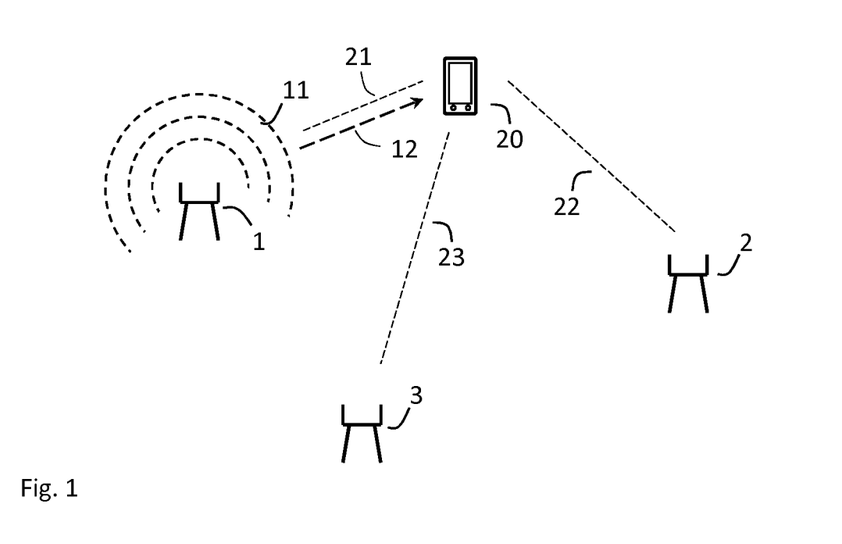
FIG. 1 illustrates a radio communications network, comprising a number of base stations and a mobile station.

FIG. 1 illustrates a typical cellular radio system, in which one or more mobile terminals 20 (also known as mobile stations, mobile devices and/or user equipment units (UEs)) communicate via a radio access network (RAN) with one or more core networks. The radio access network covers a geographical area which is divided into cell areas, with each cell area being served by a base station 1, 2, 3, e.g., a radio base station, which in some networks may also be called, for example, a "NodeB" (UMTS) or "eNodeB" (LTE). A cell is a geographical area where radio coverage is provided by the radio base station 1, 2, 3 equipment at a base station site. Each cell is identified by a cell identity within the local radio area, which is broadcast in the cell. In some versions of the radio access network such as the third generation Universal Mobile Telecommunications System (UMTS), several base stations 1, 2, 3 are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks. In cellular telecommunications, the term "handover" may refer to the process of transferring an ongoing call or data session involving a wireless terminal 20 from one node, channel, or radio access technology to another node, channel, or radio access technology. Herein, though, handover is used to also denote cell reselection, as may be controlled and carried out by the terminal 20 in idle mode. It may be noted that the present invention as described herein is not limited to UMTS or LTE, nor to any type of 3 GPP mobile communications systems. These types of network systems are merely discussed so as to give examples of different frameworks, within which the invention may be employed. So, despite the specific terms used in the aforementioned systems, the term base station 1, 2, 3 will be used in the following for generally denoting a radio station serving one cell. Also, as is commonly known in the art of mobile communications, the logical term cell is occasionally used instead of base station 1, 2, 3, although the skilled person will understand that the communication as such is carried out by the base station 1, 2, 3 of that cell. Several base stations 1, 2, 3 are normally connected in a network (not shown as such in the drawings), and are employed for radio communication with a plurality of mobile devices.

FIG. 1 illustrates three base stations 1, 2, 3 of a radio communications system, and a terminal 20. The terminal 20 is camped to the base station 1, i.e. the serving base station or cell 1. FIG. 1 illustrates a scenario in which the strength or quality of a signal 21, sent from the serving base station 1, has been deemed by the terminal to be poorly received. This may be determined by means of Radio Link Monitoring (RLM). In this situation, the terminal 20 has initiated a cell selection process, including making measurements on other base station signals 22, 23 from base stations 2, 3 of cells in the neighbourhood, so as to attempt to find suitable candidates for cell reselection, or handover.

Figure 2:
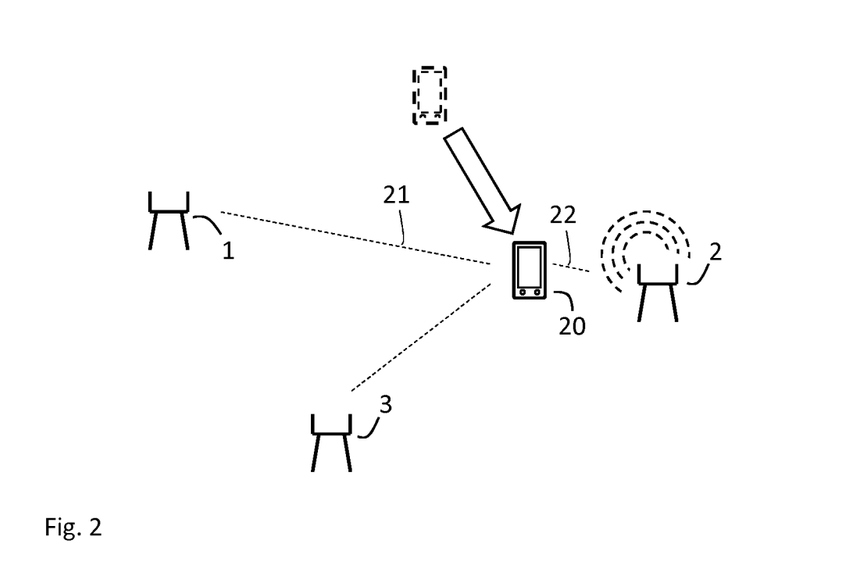
FIG. 2 schematically illustrates handover of the terminal in FIG. 1 to another base station in the radio communications network.

In FIG. 2, the terminal 20 has moved, and in that process found that the signal 22 from another base station 2 is better, i.e. stronger and/or otherwise of better quality than the signal 21 from the original base station 1. A cell reselection has therefore been made, after which the terminal 20 is camped to the newly selected base station 2. The terminal 20 may still be in idle mode, during and after the cell reselection, meaning that no data or voice communication session is going on. Various embodiments relating to cell reselection will be described below, which typically start from the scenario shown in FIG. 1, with the terminal 20 being camped to base station 1.

Machine Type Communication (MTC), also known as Machine to Machine (M2M) communication, may refer to wireless communication between different or similar electronic devices, or between an electronic device and a base station. Terminals configured to operate with machine type communication may be referred to as MTC terminals, which may include inventory tracking sensors, transportation vehicles, intelligent utility meters, security/alarm devices, gas monitoring devices, vending machines, point of sale devices, etc. MTC terminals may cycle between an idle mode and a connected mode. In the connected mode, the MTC terminal establishes a wireless connection with a base station. Such wireless connection may include channels for transmitting control signals and for transmitting user data. In the idle mode, the MTC terminal does not use the wireless connection to transmit data, and thus one or more components of MTC terminal (e.g., a transceiver, a processor, etc.) shut down or hibernate in order to reduce power consumption. An MTC terminal may establish an extended discontinuous reception (DRX) cycle of a certain periodicity. When used herein, "extended DRX cycle" refers to a DRX cycle having a cycle duration much longer than those of conventional DRX cycles. For example, an extended DRX cycle may have a cycle duration in the order of 10-60 seconds, in the order of minutes (e.g., 1 minute, 2 minutes, 5 minutes, 10 minutes, 30 minutes, 50 minutes), hours (e.g., 1 hour, 2 hours, 5 hours, 10 hours, 20 hours), days, weeks, etc. In contrast, a conventional DRX cycle may have a cycle duration on the order of a few seconds.

Figure 3A:
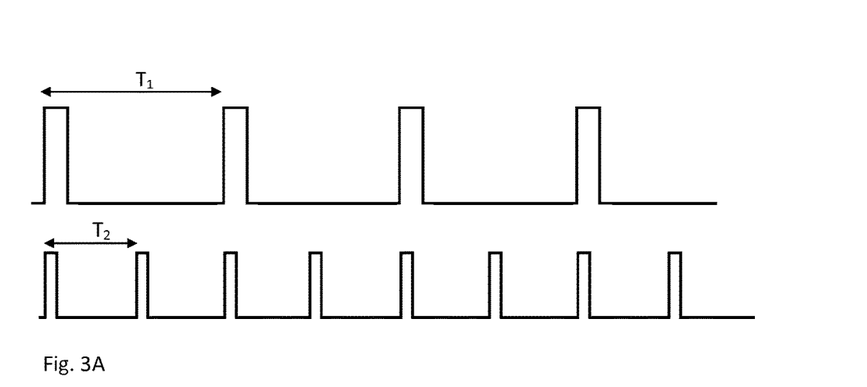
FIGS. 3A-C schematically illustrate measurements in idle mode during an extended reception scheme, for various embodiments.

FIG. 3A illustrates, in the upper curve, an example of an extended DRX cycle in accordance with some embodiments. Each cycle duration of the extended DRX cycle, having an interval $T_1$, includes an ON duration and an OFF duration. The On duration is indicated by the "high" portions of the curve, and the OFF periods by the "low" portions of the curve. In various embodiments, the MTC terminal 20 and its serving base station 1 may negotiate the length of the ON duration and the length of the OFF duration as part of establishing a wireless connection. Such DRX interval parameter signalling may e.g. be included in the cell broadcast information 11 within a system information block (SIB). In one embodiment an extended DRX value may be specified for a set of terminals by coupling the use of a certain extended DRX profile to specific UE categories. All terminals of that specific UE category may then be configured, upon detecting the broadcast information 11, to make use of the extended DRX profile as fixed usage of this value. In one embodiment, an MTC terminal may be one such UE category. In another embodiment, there may be different types of UE categories for different types of MTC terminals. In an alternative embodiment, the usage of normal or extended DRX may be signalled as an additional configuration parameter, e.g. in RRC (Radio Resource Control) configuration 12, to the terminals.

Figure 3B:
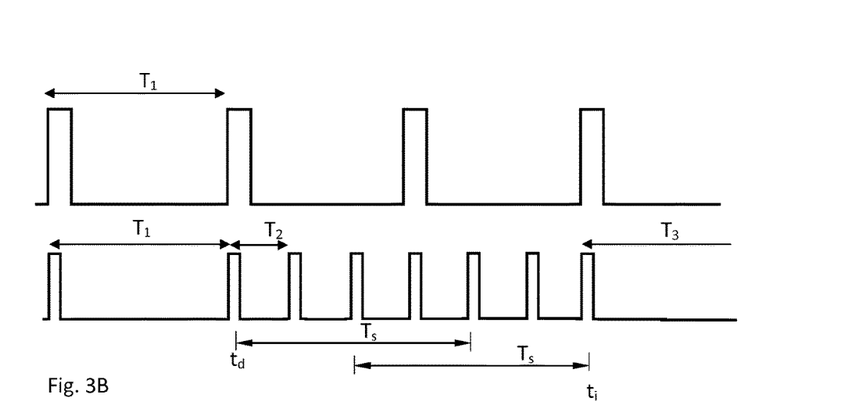
Figure 3C:
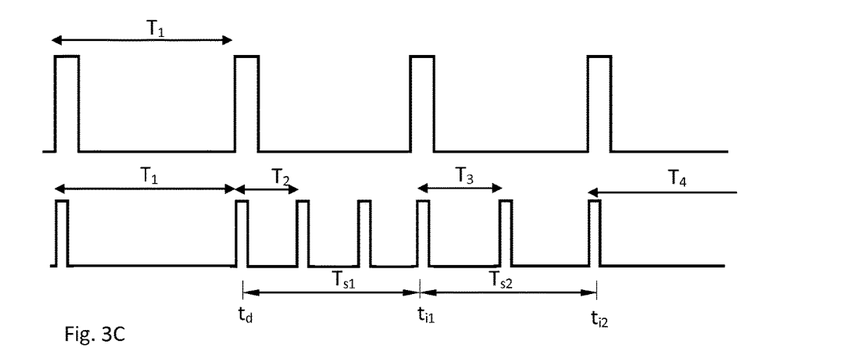

In the extended DRX scenario, the base station 1 may only transmit messages to the terminal 20 during the ON durations of the extended DRX cycle. In addition, the terminal 20 may only listen for transmissions, i.e. paging, from the base station 1 during the ON cycle of the extended DRX cycle. Thus, the terminal 20 may deactivate or otherwise reduce power to any components related to radio reception, e.g. transceiver, processor, etc. during the OFF cycle of the extended DRX cycle. In this manner, the extended DRX cycle may enable the terminal 20 to reduce power consumption. Note that, for the sake of simplicity, the relative lengths of the ON duration and the OFF duration shown in the drawings are not to scale. In particular, the OFF duration of an extended DRX cycle is much longer relative to the ON duration than is shown in FIGS. 3A-C. The ratio of the OFF duration to the ON duration of an extended DRX cycle may be greater than e.g., 100:1, 500:1, 1000:1, 10000:1, or even greater.

In the context of extended DRX, terminals may adapt to an adjusted measurements schedule, extended in accordance with the extended DRX cycle. For example, Radio Link Monitoring (RLM) may be synchronized with the extended DRX cycle, i.e. to be carried out in the ON periods of the extended DRX cycle. For long extended cycles, though, with long intervals $T_1$, this will increase the risk that a terminal 20 loses contact with the serving base station 1, e.g. if the terminal 20 has moved in the OFF period. To target this problem, it is proposed herein to set a new serving cell measurement interval, specified for use in combination with base station idle mode DRX signalling. In various embodiments, the minimum measurement interval as currently specified in TS 36.133 may be used as default value for the measurement interval, with an option to override such fixed value by means of UE specific signalling. Such a proposal is based on a possibility for network controlled adaption of the measurement interval, to find a good compromise between mobility support and low modem duty cycle (i.e. long battery life). If the UE specific signalling is utilized this could be part of RRC configuration messaging in TS 36.331. In other embodiments, the same type of measurement interval setting may be employed for all terminals, i.e. all UE types.

In various embodiments, the baseline approach is to utilize the extended DRX interval value also as default measurement interval. The rational could be that extended DRX is primarily for the devices with high focus on power saving, such as MTC. However, the network, or the terminal, may have information that indicates the extended DRX interval value is unsuitable as measurement interval for a specific UE. A reason can be e.g. that the UE has performed a cell reselection, or a certain amount of cell reselections during a certain amount of time, or that the UE has specifically indicated whether it is stationary or not. Such an event may be monitored, for triggering a change of the measurement interval, without changing the extended DRX interval. The detection of the occurrence of such a triggering event may be used to select a shorter measurement interval, or to select a longer measurement interval. This may be under the control of the network, and then signalled 12 to the terminal 20 through the serving base station. Alternatively, the terminal 20 may by itself, or with assistance from data 11, 12 received from the serving base station 1, determine that a triggering event to change the measurement interval has occurred. In various embodiments, certain radio access related events could trigger a shorter measurement interval for a period of time. For example a specification to include a timer that defines a shorter measurement interval than the extended DRX to be used after a cell reselection has occurred.

Returning to FIG. 3A, the upper curve shows a reception periodicity for a terminal operating according to an extended DRX cycle, as mentioned, having an interval $T_1$. During the ON time, i.e. the high portions of the upper curve, a terminal 20 may e.g. listen for paging signals addressed to it from the serving base station 1. The terminal 20 must therefore apply a reception periodicity, which is synchronised with the currently applicable DRX cycle employed by the base station 1. For this purpose, the terminal 20 may be configured to receive a signal from the network, via a serving base station 1, comprising data determining the reception periodicity, including the reception interval $T_1$. In one embodiment, the reception periodicity may be signalled by broadcasting 11. From received data, a given reception periodicity for a given type of terminal may be established by a receiving terminal 20. Such terminals may then be configured to apply such a given reception periodicity if the terminal is of said given type of terminal. Alternatively, terminal (UE) specific signalling 12 may be employed, e.g. using RRC signalling.

The lower curve in FIG. 3A shows a measurement periodicity, having a second interval $T_2$, according to which the terminal 20 is configured to performing radio link measurements so as to determine the need for cell selection. More specifically, the second interval $T_2$ is shorter than the first interval $T_1$. This shorter interval $T_2$ for radio link measurements, as compared to the interval of the reception periodicity $T_1$, is selected to compensate for the fact that the OFF period in the DRX cycle may be so long that there is a risk for the terminal 20 to lose contact with the serving base station 1 without being able to make cell reselection. In this embodiment, it will be realised that the serving base station 1 must transmit a signal for the terminal 20 to measure, such as a pilot signal, at all instances where the measurement periodicity has a peak, i.e. with an interval $T_2$. Since the issue of power conservation is primarily a requirement on the terminal side, and not the network side, the extra transmission of the pilot signal does not as such counteract the purpose of the extended DRX. Furthermore, the measurement of the pilot signal according to the measurement periodicity, at intervals $T_2$, will still be as scarce as deemed appropriate by the network, or the terminal 20. FIG. 3A shows an embodiment in which the measurement periodicity has twice the frequency of the reception periodicity, i.e. where $T_1=2\times T_2$. In other embodiments the first interval $T_1$ is n times the second interval $T_2$, where n is an integer >1, e.g. 2, 3, 4, or more. Furthermore, FIG. 3A indicates a situation where the measurement periodicity is consistently of higher frequency than the reception periodicity. The terminal 20 may be configured to receive a signal from the network, typically from its serving base station 1, which signal comprises data determining the measurement periodicity, including the measurement interval $T_2$. In one embodiment, the measurement periodicity may be signalled by broadcasting 11. From received data, a given measurement periodicity for a given type of terminal may be established by a receiving terminal 20. Such terminals may then be configured to apply such a given measurement periodicity if the terminal is of said given type of terminal. Alternatively, terminal (UE) specific signalling 12 may be employed, e.g. using RRC signalling.

FIG. 3B illustrates an embodiment, in which the measurement periodicity only at certain periods of time has a shorter interval $T_2$ than the interval $T_1$ of the reception periodicity. Such an embodiment has the benefit a higher degree of power conversion. In the illustrated embodiment the measurement periodicity has three times the frequency of the reception periodicity, in the period when the measurement periodicity is increased. In other variants of this embodiment, the first interval $T_1$ is n times the second interval $T_2$, where n is an integer >1, e.g. 2, 3, 4, or more. The shorter interval $T_2$ may be applied to the measurement periodicity responsive to detection of the occurrence $t_d$ of an interval decrease triggering event. In one embodiment, the interval decrease triggering event may be the determination by the terminal 20, upon measuring the link to the serving base station 1, that cell selection should be initiated. This may be concluded based on e.g. the signal strength falling below a certain threshold, or the quality of the signal being inferior, in accordance with known solutions in the art. Upon the occurrence at $t_d$ of the interval decrease triggering event, the terminal 20 may start measuring pilot signals of neighbouring base stations, so as to find appropriate candidates for cell reselection. The determined need for cell selection may indicate that the terminal has begun to move, with respect to the network, or simply that the reception of the signal from the serving base station has become inferior. In any case, it also indicates that the signal strength and quality should be measured more frequently. Therefore, the interval of the measurement periodicity is shortened for a period of time. In one embodiment, the interval is decreased responsive to a cell reselection being made to another base station 2. In another embodiment, the interval is decreased responsive to initiation of cell selection, i.e. measuring and comparing signals from other base stations 2, 3, regardless of whether a cell reselection is carried out by the terminal 20 or not. In the embodiment of FIG. 3B, the measurement periodicity is consistent with the reception periodicity prior to the detection of the occurrence at $t_d$ of an interval decrease triggering event. In an alternative embodiment, the measurement periodicity may have shorter interval than the interval $T_1$ of the reception periodicity already before $t_d$. In any event, a shorter interval $T_2$ is set responsive to the detection of the occurrence of an interval decrease triggering event.

In one embodiment, consistent with the example of FIG. 3B, the shorter measurement interval $T_2$ is maintained for at least a predetermined period $T_s$ after the interval decrease triggering event, e.g. cell re selection. If the interval decrease triggering event is again detected within that period, e.g. a new cell reselection is carried out within that period $T_s$, an additional period of $T_s$ is applied after that new interval decrease triggering event. In FIG. 3B, a new cell reselection is detected at $t_d+T_2$ to have occurred, whereby a new period $T_s$ is started, for maintaining the shorter measurement interval $T_2$. In one embodiment, a third interval $T_3$ for the measurement periodicity is applied after using the second interval $T_2$, wherein the third interval is longer than the second interval. The third interval $T_3$ is applied responsive to detection of occurrence of an interval increase triggering event. In one embodiment, the interval increase triggering event is deemed to have occurred at $t_i$, i.e. when no cell reselection is detected in the preceding period $T_s$, upon which the measurement periodicity may return to a longer interval $T_3$, for conserving power. The longer period $T_3$ may be the same as interval $T_1$ of the reception periodicity, or shorter.

In a variant of this embodiment, the interval decrease triggering event may be the occurrence at $t_d$ of a predetermined number of cell selections, or actual cell reselections, made by the terminal 20 within a decisive period of time. The number of selections or reselections made within a period of time may indicate a speed of movement, and when more than a pre-selected number of reselections are required within a certain time period, this may indicate movement at a higher speed than what is suitable for the current measurement periodicity interval. Upon detection of this scenario, the interval of the measurement periodicity may be decreased.

In one embodiment, when the measurement interval has decreased, and the terminal subsequently (after $t_d$) performs measurements on the serving base station signal more frequently, the terminal is configured to perform averaging over several measurements, obtained at several intervals. This falls in line with what is specified in 3GPP specification TS 36.133. When averaging has been performed over a predetermined number of measurement cycles at the decreased interval $T_2$, and it is determined that no cell selection is required, this may be taken as the interval increase triggering event. Upon the occurrence of that triggering event, the terminal 20 is configured to increase the interval of the measurement periodicity to $T_3$, which may be equal to $T_1$ or shorter. In a preferred embodiment, the terminal is configured to perform averaging only when the measurement periodicity has an interval shorter than a predetermined level, e.g. 5 s, 10 s, 30 s, 1 min or other level.

In another embodiment, consistent with FIG. 3B, the terminal 20 may be configured to determine its own position. This may be accomplished by means of measuring radio signals from the base station, according to well-known processes, or e.g. by receiving Global Positioning System (GPS) signals. Positioning signals are thus received either from one or more base stations 1, 2, 3, or from GPS satellites. Based on these positioning signals, a measurement of movement of the terminal 20 is established. A measurement of movement of the terminal 20 can also be established if the terminal is equipped with velocity estimator utilizing received pilot signals. When this measurement of movement indicates that the terminal is moving with respect to the network base stations 1, 2, 3, the interval decrease triggering event is deemed to have occurred. Upon the detection at $t_d$ of the interval decrease triggering event, i.e. that the terminal 20 is moving, it may be concluded that the terminal 20 should initiate cell selection, and may subsequently need cell reselection. For this purpose, the measurement periodicity interval may be decreased to $T_2$, so as to more frequently perform link measurements on the connection to the serving base stations. In this embodiment, a third interval $T_3$ for the measurement periodicity is applied after using the second interval $T_2$, wherein the third interval is longer than the second interval. The third interval $T_3$ is applied responsive to detection of occurrence of an interval increase triggering event. In one embodiment, the interval increase triggering event may be deemed to have occurred using the same criteria as described above, e.g. at $t_i$ when no cell selection or reselection is detected within a preceding period $T_s$, upon which the measurement periodicity may return to a longer interval $T_3$, for conserving power. In one alternative embodiment, the interval increase triggering event may be deemed to have occurred upon determination, at $t_i$, that the terminal 20 is no longer moving, meaning that it is deemed to be still or merely moving at a speed not requiring a decreased measurement periodicity interval. The longer period $T_3$ may be the same as interval $T_1$ of the reception periodicity, or shorter.

FIG. 3C illustrates a variant of the embodiment of FIG. 3B. In this embodiment, a first increased measurement periodicity, with interval $T_2<T_1$ may be employed after detection of the occurrence of an interval decrease triggering event at $t_d$. The interval decrease triggering event may be any one the events outlined with reference to FIG. 3B. At a subsequent point in time $t_{r1}$, the terminal may be configured to set the measurement interval to $T_3$, wherein $T_2<T_3<T1$, responsive to the occurrence of a first interval increase triggering event at $t_{r1}$. In other words, the measurement periodicity will thereby be set to have a shorter interval $T_3$ than the reception periodicity $T_1$, but nevertheless increased with respect to the preceding period $T_{s1}$, with interval $T_2$. The first interval increase triggering event may e.g. be the determination that no cell reselection has occurred within a period $T_{s1}$ preceding $t_{r1}$. At the occurrence of a second interval increase triggering event at $t_{r2}$, the measurement periodicity may be increased to have an interval $T_4$, which may be the same as or shorter than $T_1$. The second interval increase triggering event may correspond to the first interval increase triggering event, i.e. that no cell reselection has occurred in a preceding period $T_{s2}$. In one embodiment, the second interval increase triggering event may be that no cell selection has been deemed to be needed in the preceding period $T_{s2}$.

In another embodiment, the first interval increase triggering event may be the determination that the terminal 20 is moving at a lower speed than what caused the interval decrease at $t_d$, but still more than a certain minimum level reflecting no movement. Once the terminal 20 determines that it is not even moving faster than said minimum speed level, it may be determined that a second interval increase triggering event has occurred, e.g. at $t_2$. At the occurrence of a second interval increase triggering event at $t_2$, the measurement periodicity may be increased to have an interval $T_4$, which may be the same as or shorter than $T_1$.

The embodiment of FIG. 3C may be one way of minimising excessive signal measurements when a terminal 20 only makes occasional cell selections and reselections, since the terminal will be configured to more rapidly return to longer intervals.

Figure 4:
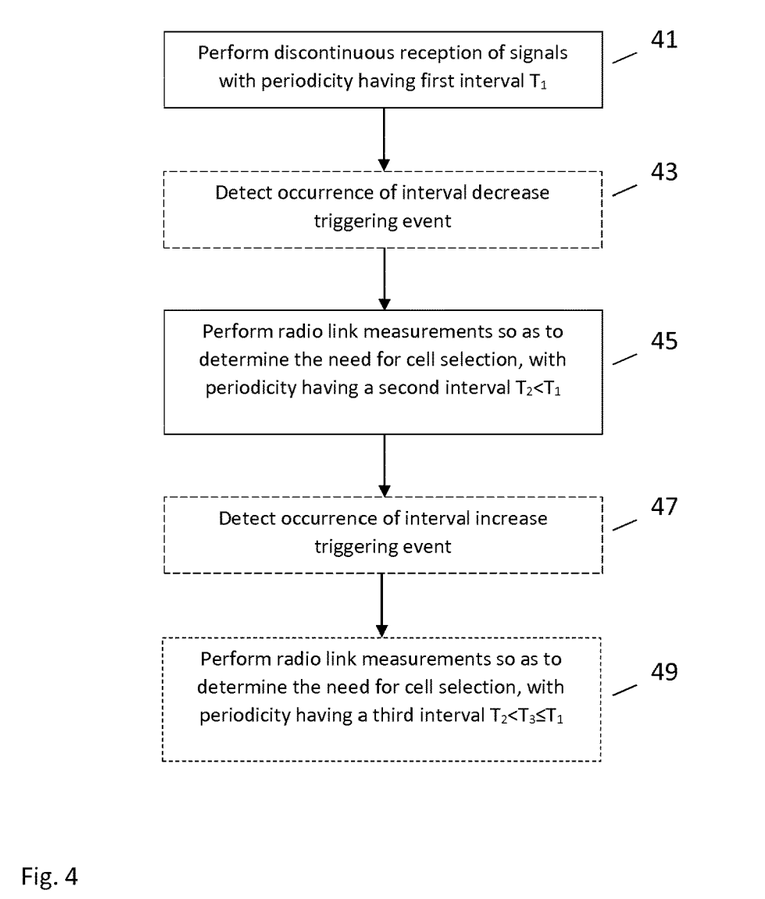
FIG. 4 illustrates a number of method steps of an embodiment, including some optional steps.

FIG. 4 illustrates a flow chart, including certain steps carried out in accordance with various embodiments, where at least the steps encircled by dashed lines may be optional. Reference to the steps of FIG. 4 below will also include reference to the other drawings, where appropriate.

In step 41, a terminal 20 operates under an extended discontinuous reception cycle in connection with a network, through a serving base station 1. The terminal then performs discontinuous reception of signals from the serving base station 1, with a periodicity having a first interval $T_1$.

In step 43, which may refer to the schemes of the embodiments of FIG. 3B or C, the terminal 20 detects occurrence of an interval decrease triggering event. This may be detected by the terminal 20 by itself, e.g. by means of measuring the strength and/or quality of the link to the serving base station 1, or by detecting movement based on received GPS signals. Alternatively, the terminal may collect data, which is reported to the network during ON periods of the reception periodicity. The detection of the occurrence of the triggering event may then be an order or instruction, received by the terminal 20 as data from the serving base station 1, to decrease the interval of a measurement periodicity.

In step 45, the terminal 20 performs radio link measurements so as to determine the need or appropriateness for cell selection, with a periodicity having a second interval $T_2<T_1$. By performing radio link measurements of the serving base station 1 at a measurement periodicity with a shorter interval $T_2$, while operating under extended DRX reception at a longer interval $T_1$, power consumption may be held low while minimising the risk of losing connection between terminal 20 and the base station 1.

In step 47, which may refer to the schemes of the embodiments of FIG. 3B or C, the terminal 20 detects occurrence of an interval increase triggering event. Also this event may be detected by the terminal 20 by itself, e.g. by means of measuring the strength and/or quality of the link to the serving base station 1, or by detecting a level of movement based on received GPS signals or based on UE velocity estimator utilizing received pilot signals. Alternatively, the terminal may collect data, which is reported to the network during ON periods of the reception periodicity. The detection of the occurrence of the triggering event may then be an order or instruction, received by the terminal 20 as data from the serving base station 1, to increase the interval of the measurement periodicity.

In step 49, which requires the preceding occurrence of step 47, the terminal performs radio link measurements with periodicity having a third interval $T_2<T_3 \leq T_1$. This step, together with preceding step 47, represents a stepwise increase of the interval of the measurement periodicity, once the level of the measurement periodicity has been decreased.

Figure 5:
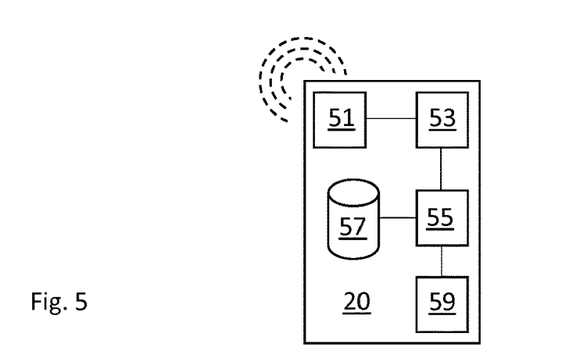
FIG. 5 schematically illustrates a terminal configured to operate in accordance with various embodiments described herein.

FIG. 5 schematically illustrates a terminal 20, configured to operate according to the embodiments outlined herein. Since the components necessary for operating a radio communication terminal are known in the art as such, the following description of the terminal 20 is given without specific details. The terminal 20 comprises a controller 55 including a processor. The controller 55 is connected to a memory 57, holding computer program code, which may be executed by means of the processor of the controller 55 to operate the terminal 20, e.g. so as to carry out the method steps outlined herein. A radio transceiver 53 is on one hand connected to the controller 55, and also to an antenna 51, for radio communication with base stations 1, 2, 3 of a cellular radio communications system. The terminal 20 may further comprise a positioning unit 59, e.g. including an antenna for reception of GPS satellite signals. The terminal 20 may further comprise a user interface (not shown), or a connector to an external user interface, and a power source (not shown) such as a battery. The terminal 20 may be an MTC terminal, and may be operated in accordance with the embodiments described herein.

While the invention has been discussed in the foregoing on a general level, and with respect to certain embodiments, the references given to 3GPP networks and specifications shall be understood as non-limiting examples of radio communications systems. For the sake of clarity, it should also be noted that where a point in time is denoted herein as following a period of time, this is not to be understood as restricted to the meaning that said point in time marks the end point of that preceding period. On the contrary, there may e.g. be some additional time between a certain point in time and its preceding period of time. As an example, a period may relate to one or more interval cycles, as shown in the drawings, after which there may be some time for calculation before determining that an event has occurred. With the same reasoning, the opposite situation also applies, namely that a given point in time preceding a following period, need not mark the starting point of that period. As an example, where it is determined at a certain point in time that cell selection should be initiated, and actual cell reselection is used as the interval decrease triggering event, the subsequent period may be measured in number of cycles. The completion of the cell reselection may well be completed sometime into the following period, though. Furthermore, the skilled person will realise that where not contradictory, the disclosed embodiments above may be combined in various combinations.

The invention claimed is:

1. A control method for a terminal in a wireless communication system including a network of base stations, the method comprising:
    performing discontinuous reception of signals from a serving base station so as to listen for a paging message, with a reception periodicity having a first interval; and
    responsive to detection of occurrence of an interval decrease triggering event, performing radio link measurements so as to determine the need for cell reselection, with a measurement periodicity having a second interval and for a first time period having a predetermined duration, and
    wherein the second interval is shorter than the first interval, and
    wherein said interval decrease triggering event is a cell reselection made by the terminal from the serving base station to another base station within the network of base stations, and
    responsive to another detection of the interval decrease triggering event during performance of the radio link measurements, maintaining performance of the radio link measurements with the measurement periodicity having the second interval, for a second time period having the predetermined duration, the second time period started after the another detection of the interval decrease triggering event and before expiration of the first time period.

2. The method of claim 1, wherein a further interval decrease triggering event is the occurrence of a predetermined number of cell reselections made by the terminal within a predetermined period of time.

3. The method of claim 1, comprising:
receiving positioning signals;
establishing a measurement of movement based on the positioning signals;
wherein a further interval decrease triggering event is a determining that the terminal is moving.

4. The method of claim 1, comprising:
applying a third interval for the measurement periodicity after the step of performing radio link measurements with a measurement periodicity having the second interval, wherein the third interval is longer than the second interval, responsive to detection of occurrence of an interval increase trigger.

5. The method of claim 4, wherein said interval increase trigger is the absence of any cell reselection within a predetermined period of time.

6. The method of claim 4, comprising:
receiving positioning signals;
establishing a measurement of movement based on the positioning signals;
wherein said interval increase trigger is a determination that the terminal is no longer moving.

7. The method of claim 4, wherein the third interval is equal to the first interval of the reception periodicity.

8. The method of claim 1, wherein the first interval is n times the second interval, where n is an integer >1.

9. The method of claim 1, comprising:
receiving a signal from the network, comprising data determining the reception periodicity, and
receiving a signal from the network, comprising data determining the measurement periodicity.

10. The method of claim 9, comprising:
establishing, from said data, a given reception periodicity for a given type of terminal, and
applying said given reception periodicity if the terminal is of said given type of terminal.

11. The method of claim 9, comprising:
establishing, from said data, a given measurement periodicity for a given type of terminal, and
applying said given measurement periodicity if the terminal is of said given type of terminal.

12. A terminal for operating with discontinuous reception in a wireless communication system that includes a network of base stations, the terminal comprising:
a transceiver configured to transmit and receive signals to and from a serving one of the base station; and
a controller connected to the transceiver, configured to control the transceiver to perform discontinuous reception of signals from the serving base station so as to listen for a paging message, with a reception periodicity having a first interval; and
responsive to detection of occurrence of an interval decrease triggering event, control the transceiver to perform radio link measurements so as to determine the need for cell reselection, with a measurement periodicity having a second interval and for a first time period having a predetermined duration, and
wherein the controller is configured to set a shorter second interval for the measurement periodicity than the first interval of the reception periodicity, and
wherein said interval decrease triggering event is a cell reselection made by the terminal from the serving base station to another base station within the network of base stations, and
responsive to another detection of the interval decrease triggering event during performance of the radio link measurements, maintain performance of the radio link measurements with the measurement periodicity having the second interval, for a second time period having the predetermined duration, the second time period started after the another detection of the interval decrease triggering event and before expiration of the first time period.

13. The terminal of claim 12, wherein a further interval decrease triggering event is the occurrence of a predetermined number of cell reselections made by the terminal within a decisive period of time.

14. The terminal of claim 12, wherein the controller is configured to control the terminal to
receive positioning signals;
establish a measurement of movement based on the positioning signals;
wherein a further interval decrease triggering event is a determining that the terminal is moving.

15. The terminal of claim 12, wherein the controller is configured to control the terminal to apply a third interval for the measurement periodicity after the applying the second interval, wherein the third interval is longer than the second interval, responsive to detection of occurrence of an interval increase trigger.

16. The terminal of claim 15, wherein said interval increase trigger is the absence of any cell reselection within a predetermined period of time.

17. The method of claim 1, wherein the first interval is determined in accordance with a type of the terminal, the terminal being a machine type communication (MTC) terminal, and
wherein the second interval is selected to compensate for an off period of the reception periodicity being longer than a duration for which the terminal may lose contact with the serving base station without being able to make a cell reselection.

18. The terminal of claim 12, wherein the first interval is determined in accordance with a type of the terminal, the terminal being a machine type communication (MTC) terminal, and
wherein the second interval is selected to compensate for an off period of the reception periodicity being longer than a duration for which the terminal may lose contact with the serving base station without being able to make a cell reselection.

* * * * *